(12) United States Patent
Shin et al.

(10) Patent No.: US 11,618,387 B2
(45) Date of Patent: Apr. 4, 2023

(54) SIDE STEP SYSTEM AND A VEHICLE INCLUDING A SIDE STEP

(71) Applicants: HYUNDAI MOTOR COMPANY, Seoul (KR); KIA MOTORS CORPORATION, Seoul (KR)

(72) Inventors: Hyung Seop Shin, Pyeongtaek-si (KR); Tae Joo Choi, Gwangju (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 133 days.

(21) Appl. No.: 17/212,911

(22) Filed: Mar. 25, 2021

(65) Prior Publication Data

US 2022/0126754 A1 Apr. 28, 2022

(30) Foreign Application Priority Data

Oct. 23, 2020 (KR) .................... 10-2020-0138392

(51) Int. Cl.
*B60R 3/02* (2006.01)
*B60R 3/00* (2006.01)

(52) U.S. Cl.
CPC ............... *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS

| | | | |
|---|---|---|---|
| 6,550,799 B2* | 4/2003 | Farkash | B60R 3/002 182/127 |
| 8,801,009 B2* | 8/2014 | Sapir | B62K 3/002 280/87.05 |
| 2015/0321722 A1* | 11/2015 | Dadoosh | B62K 3/002 320/109 |
| 2021/0206448 A1* | 7/2021 | Dukoff | B62K 3/002 |

\* cited by examiner

*Primary Examiner* — Bryan A Evans
(74) *Attorney, Agent, or Firm* — Lempia Summerfield Katz LLC

(57) ABSTRACT

A side step system and a vehicle including a side step have a side step including an inner space that is open in an opening direction and a means of transportation that is mounted in the inner space and that is operable when separated from the inner space.

16 Claims, 13 Drawing Sheets

SIDE STEP SYSTEM AND A VEHICLE INCLUDING A SIDE STEP

CROSS-REFERENCE TO RELATED APPLICATION

This application claims the benefit of priority to Korean Patent Application No. 10-2020-0138392, filed in the Korean Intellectual Property Office on Oct. 23, 2020, the entire contents of which are incorporated herein by reference.

TECHNICAL FIELD

The present disclosure relates to a side step system and a vehicle including a side step.

BACKGROUND

When a final destination is too far away from a parking lot for an occupant of a vehicle to reach on foot, the occupant may move to the final destination using a separate means of transportation loaded in the vehicle. However, the means of transportation may occupy significant space in the vehicle. Therefore, the means of transportation may preferably be loaded in a separate loading compartment rather than a trunk.

Meanwhile, a side step structure may be applied to an SUV vehicle. A side step may be an auxiliary foot board mainly mounted on a side of a vehicle, the ride-height of which is high, to assist a child or an elderly person to get in the vehicle. The side step may be used not only to enhance the exterior of the vehicle with various designs, but also to provide convenience when a person gets in or out of the vehicle.

SUMMARY

The present disclosure has been made to solve the above-mentioned problems occurring in the prior art while advantages achieved by the prior art are maintained intact.

An aspect of the present disclosure provides a side step system for storing a means of transportation in an inner space of a side step.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a side step system includes a side step including an inner space that is open in an opening direction and a means of transportation that is mounted in the inner space and that is operable when separated from the inner space.

According to an embodiment, the means of transportation may include: a body formed to be mounted in the inner space; a wheel that is rotatably coupled to the body and that rotates to move the body; a conductor connected to the body and electrically connected with a charging terminal of the side step when the body is mounted in the inner space; and a battery that supplies electric power to rotate the wheel and that is charged when the conductor is electrically connected with the charging terminal of the side step.

According to an embodiment, the side step may further include a first guide part that guides a movement of the means of transportation in the opening direction or an opposite direction thereto when the means of transportation is mounted in or separated from the inner space.

According to an embodiment, the means of transportation may include: a body formed to be mounted in the inner space; a wheel that is rotatably coupled to the body and that rotates to move the body; and a second guide part that is formed on the body to correspond to the first guide part and that guides a movement of the body in the inner space in the opening direction or the opposite direction thereto in cooperation with the first guide part.

One of the first guide part or the second guide part may protrude toward the other and may have a protrusion shape extending along the opening direction. The other of the first or second guide part may have a groove shape corresponding to the protrusion shape.

According to an embodiment, the side step may include a side step body having the inner space formed therein and a first locking part coupled to the side step body so as to be movable between a locking position and an unlocking position to obstruct separation of the means of transportation from the inner space after the means of transportation is mounted in the inner space. In the locking position, the first locking part protrudes toward the inner space and prevents the separation of the means of transportation. In the unlocking position, the first locking part moves backward from the inner space and allows the means of transportation to be mounted in the inner space.

According to an embodiment, the means of transportation may include: a body formed to be mounted in the inner space; a wheel that is rotatably coupled to the body and that rotates to move the body; and a second locking part provided in a predetermined position on the body to correspond to a position of the first locking part. The second locking part may be formed such that the first locking part is stopped by the second locking part when the means of transportation is mounted in the inner space.

According to an embodiment, the side step may further include an elastic member that elastically restores the first locking part from the unlocking position to the locking position. The first locking part may be rotatably coupled to the side step body, may be rotated to the unlocking position by being pressed in a process in which the means of transportation is mounted in the inner space, and may be stopped by the second locking part in a process of being rotated to the locking position by the elastic member.

According to an embodiment, the side step may further include an actuator that moves the first locking part to the unlocking position or the locking position depending on an electrical signal transferred thereto.

According to an embodiment, the inner space may be formed to be open at the top. When the means of transportation is mounted in the inner space, one surface of the means of transportation may be connected with an upper surface of the side step to form a support surface that an occupant puts the occupant's foot on to get in a vehicle.

According to an embodiment, the means of transportation may include a body formed to be mounted in the inner space and a wheel that is rotatably coupled to the body and that rotates to move the body. The body may include a foot board that an occupant stands on when operating the means of transportation. The body may further include a steering member that is coupled to the foot board so as to be rotatable about a predetermined axis and that rotates toward the foot board. The steering member may be connected to the wheel whereby the occupant turns the steering member to control a travel direction when operating the means of transportation. The steering member and the foot board may be disposed adjacent to each other when the steering member is in a locked state in which the steering member is rotated toward the foot board to the maximum.

According to an embodiment, the inner space may be formed such that a direction perpendicular to the foot board and the opening direction cross each other when the means of transportation is disposed in the inner space. The foot board may have a width corresponding to a height of the inner space.

According to an embodiment, the inner space may be formed to correspond to at least part of a shape that the means of transportation has when the steering member is in the locked state.

According to an embodiment, a portion of the inner space that corresponds to a position of the wheel may be formed to be open such that at least part of the wheel protrudes from an area that the side step occupies when the means of transportation is disposed in the inner space.

According to another aspect of the present disclosure, a vehicle includes a side step including an inner space that is open in an opening direction. The side step is coupled to a lower side of the vehicle so as to be movable in an exposure direction in which the inner space is exposed outside the vehicle and in a direction opposite to the exposure direction, in which the side step, when moved in the exposure direction, assists an occupant to get in the vehicle. A means of transportation is mounted in the inner space and is separated from the inner space for operation when the side step is moved in the exposure direction.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
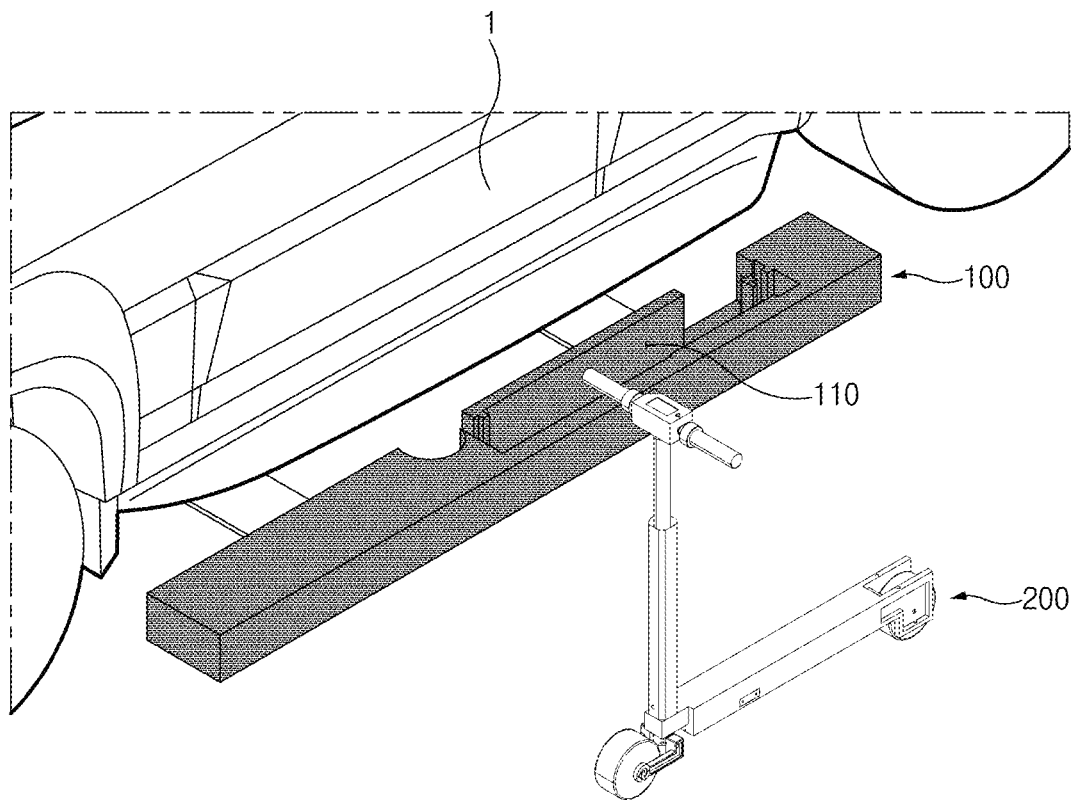
FIG. 1 is a view illustrating a side step system according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

Figure 2:
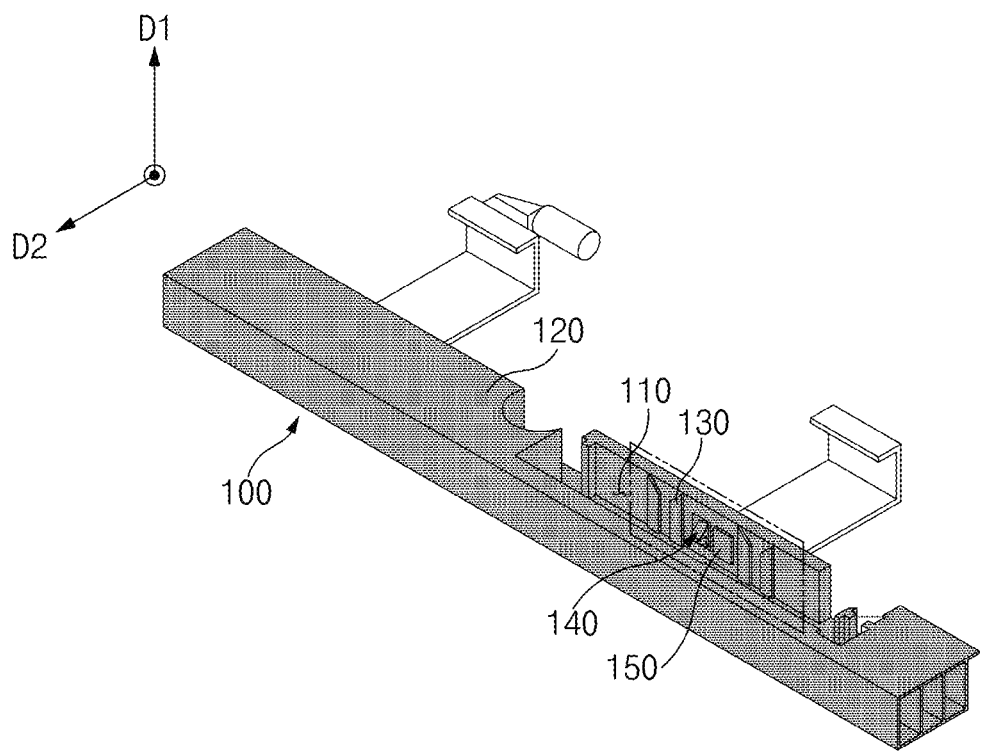
FIG. 2 is a view illustrating a side step of the side step system according to the embodiment of the present disclosure.

A side step system according to an embodiment of the present disclosure may include a side step 100 and a means of transportation 200. FIG. 1 is a view illustrating the side step system according to the embodiment of the present disclosure. FIG. 2 is a view illustrating the side step of the side step system according to the embodiment of the present disclosure.

As illustrated in FIG. 2, the side step 100 may include an inner space 110. The inner space 110 may be open in a predetermined opening direction D1. The side step 100 may be coupled to a lower side of a vehicle 1 (refer to FIG. 1) so as to be movable in an exposure direction D2 and an opposite direction thereto. The exposure direction D2 may be a direction in which the inner space 110 is exposed outside the vehicle 1 (refer to FIG. 1). When the side step 100 is moved in the exposure direction D2, the side step 100 may assist an occupant to get in the vehicle 1 (refer to FIG. 1).

Figure 3:
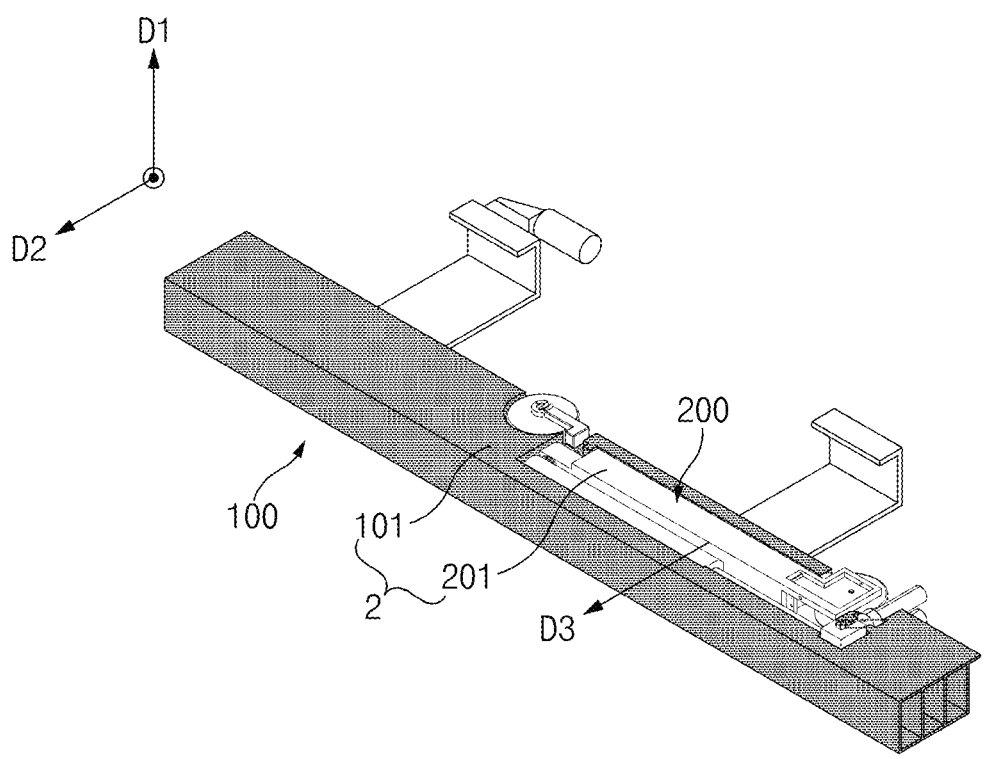
FIG. 3 is a view illustrating a state in which a means of transportation is mounted in an inner space of the side step of the side step system according to the embodiment of the present disclosure.

FIG. 3 is a view illustrating a state in which the means of transportation is mounted in the inner space of the side step of the side step system according to the embodiment of the present disclosure. As illustrated in FIG. 3, the means of transportation 200 may be mounted in the inner space 110. The means of transportation 200 may include a means of transportation capable of being operated when separated from the inner space 110. The means of transportation 200 may include various means of transportation such as an electric kickboard, an electric Segway, an electric wheel, a bicycle, an electric bicycle, and the like. In the drawings, an electric kickboard is illustrated as an example of the means of transportation 200.

The means of transportation 200 may generally occupy a significant amount of space. Therefore, a waste of space may be caused when the means of transportation 200 is loaded in a loading compartment of a vehicle, such as a trunk.

However, in the side step system according to the embodiment of the present disclosure, the means of transportation 200 may be mounted in the inner space 110 formed in the side step 100. Accordingly, the space of the vehicle 1 (refer to FIG. 1) may be efficiently used.

For example, the inner space 110 may be formed to be open at the top. In other words, the opening direction D1 may be an upper direction. As illustrated in FIG. 3, when the means of transportation 200 is mounted in the inner space 110, one surface 201 of the means of transportation 200 may be connected with an upper surface 101 of the side step 100 to form a support surface 2 together with the upper surface 101 of the side step 100. The support surface 2 may be a surface that the occupant puts the occupant's foot on to get in the vehicle 1 (refer to FIG. 1).

However, the present disclosure is not necessarily limited thereto. The inner space 110 may be open in a different direction rather than the upper direction, and the means of transportation 200 may be inserted into the inner space 110. Furthermore, a case where only the upper surface 101 of the side step 100 forms the support surface 2 also falls within the scope of the present disclosure.

Means of Transportation 200

Figure 4:
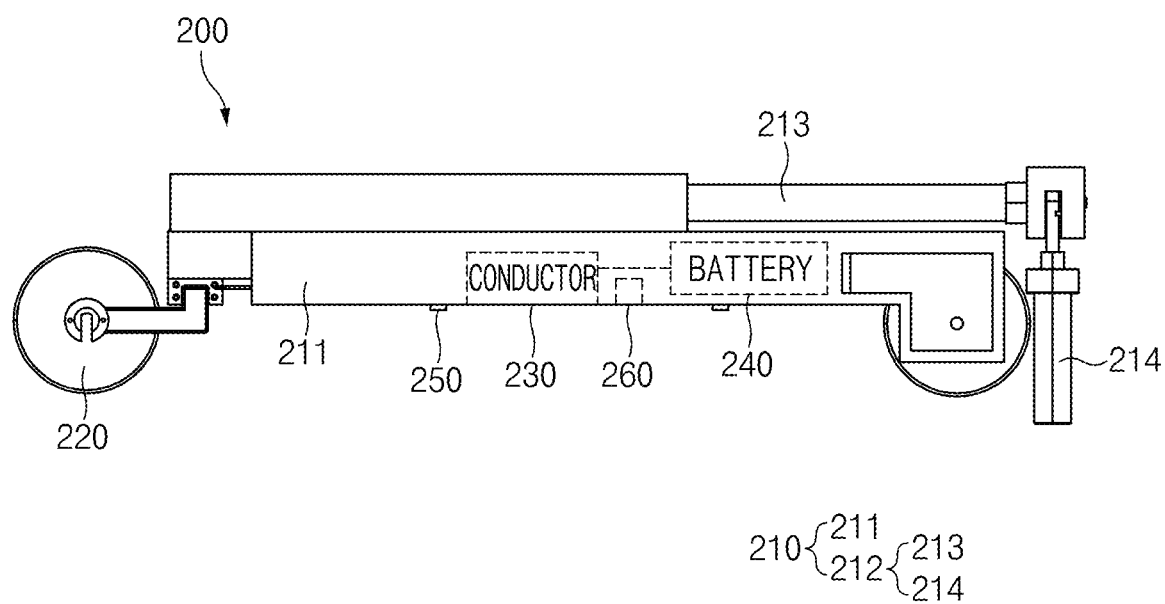
FIG. 4 is a view illustrating a state in which a body is folded to mount the means of transportation of the side step system according to the embodiment of the present disclosure in the inner space.
Figure 5:
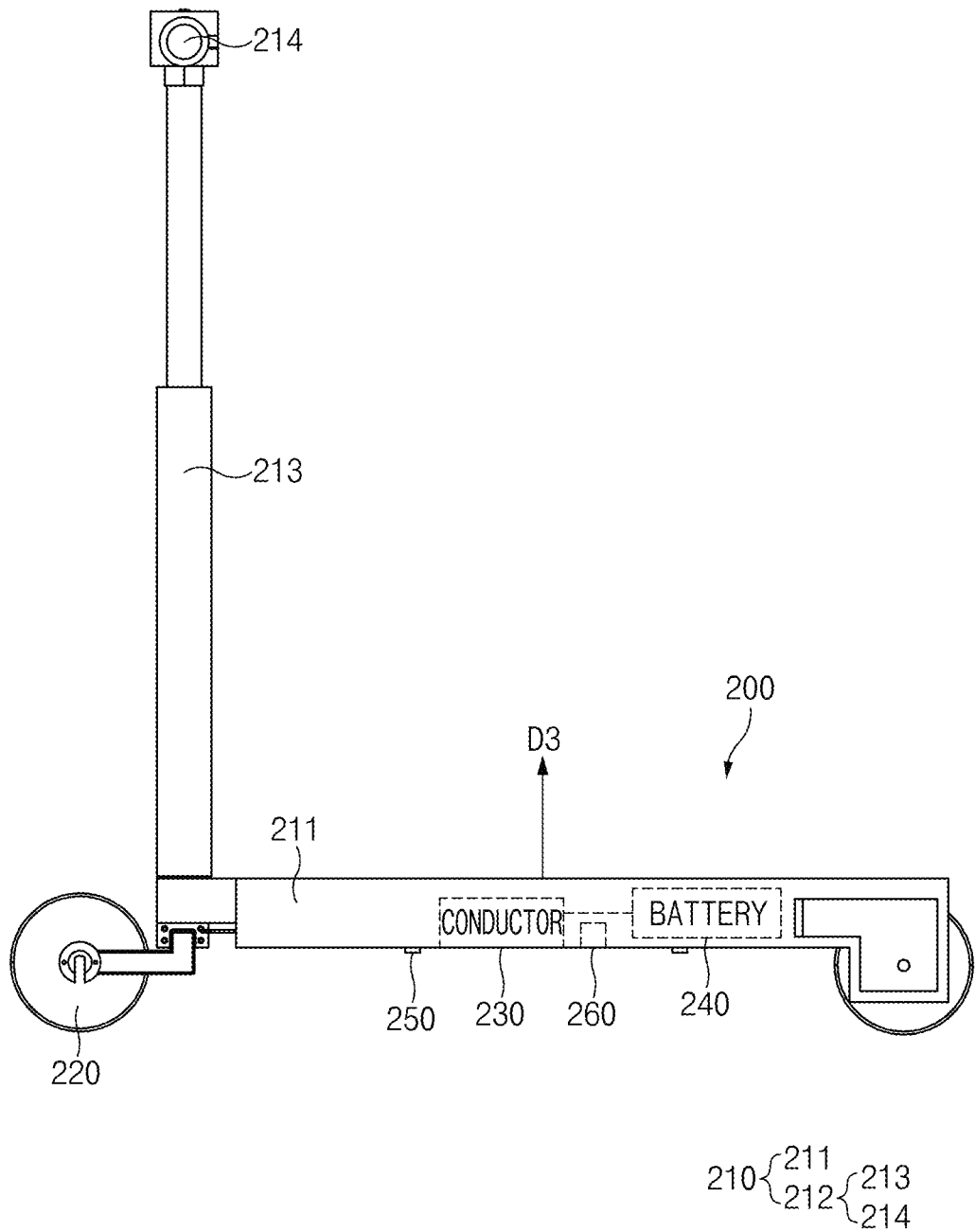
FIG. 5 is a view illustrating a state in which the body of the means of transportation of the side step system according to the embodiment of the present disclosure is unfolded for operation.

FIG. 4 is a view illustrating a state in which a body is folded to mount the means of transportation of the side step system according to the embodiment of the present disclosure in the inner space. FIG. 5 is a view illustrating a state in which the body of the means of transportation of the side step system according to the embodiment of the present disclosure is unfolded for operation.

As illustrated in FIGS. 4 and 5, the means of transportation 200 may include the body 210, a wheel 220, a conductor 230, and a battery 240. The body 210 may be formed so as to be mounted in the inner space 110. The body 210 may be folded so as to be mounted in the inner space 110 and may be unfolded for operation when separated from the inner space 110.

The wheel 220 may be rotatably coupled to the body 210 and may rotate to move the body 210. For example, the wheel 220 may include one or more wheels and may have a structure such as a caterpillar.

The conductor 230 may be connected to the body 210 and may be electrically connected with a charging terminal 150 of the side step 100 when the body 210 is mounted in the inner space 110. The electrical connection may include both wired connection and wireless connection.

The battery 240 may be charged while the conductor 230 is electrically connected with the charging terminal 150 of the side step 100. The battery 240 may supply electric power to rotate the wheel 220.

In a case where the means of transportation 200 uses electric power, it is essential to charge the means of transportation 200. In this embodiment, in a case where the means of transportation 200 is able to be charged in a place where the means of transportation 200 has to be stored, the means of transportation 200 may be efficiently charged.

In the case of the side step system according to the embodiment of the present disclosure, when the means of transportation 200 is mounted in the inner space 110, the conductor 230 of the means of transportation 200 and the charging terminal 150 of the side step 100 may be electrically connected with each other, and the battery 240 may be charged. Accordingly, the place for storing the means of transportation 200 may be in agreement with the place for charging the means of transportation 200, and thus the means of transportation 200 may be efficiently charged.

Guide Parts

Figure 6:
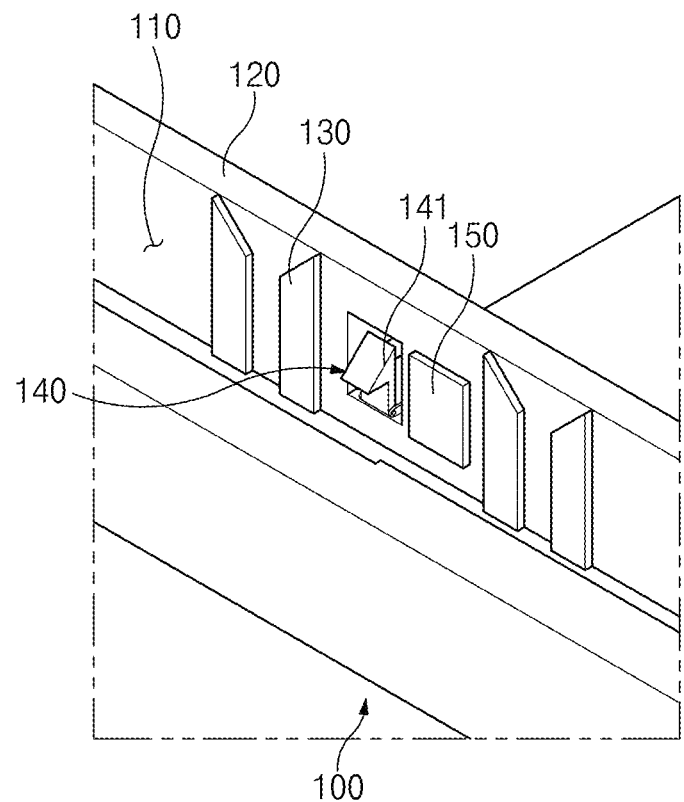
FIG. 6 is an enlarged view of a portion shown by a dash-dot-dot line of FIG. 2.
Figure 7:
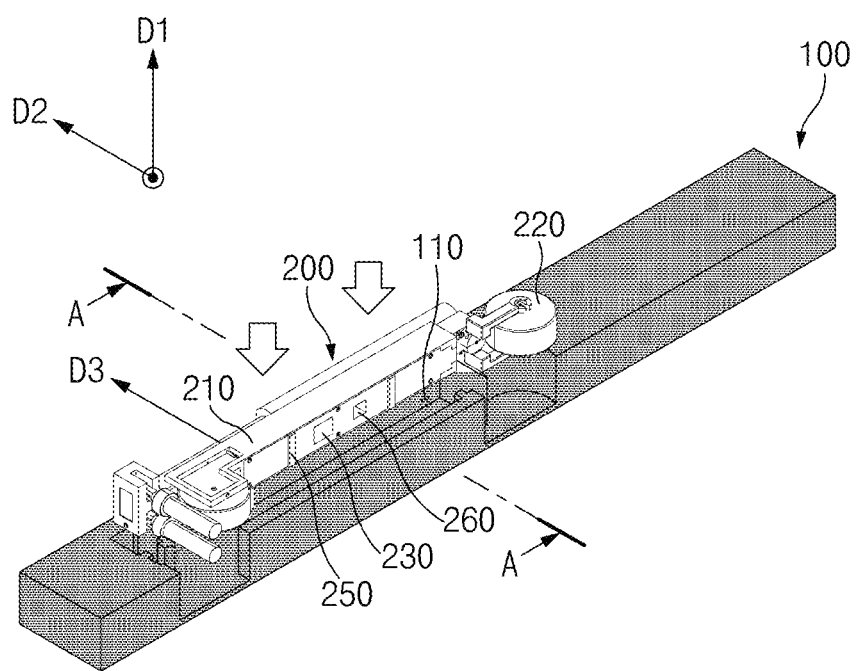
FIG. 7 is an enlarged view of a portion where a second guide part and a second locking part of the means of transportation in the side step system according to the embodiment of the present disclosure are illustrated.

FIG. 6 is an enlarged view of a portion shown by a dash-dot-dot line of FIG. 2. A first guide part 130 and a first locking part 140 of the side step 100 of the side step system according to the embodiment of the present disclosure are illustrated in the area shown by the dash-dot-dot line of FIG. 2. FIG. 7 is an enlarged view of a portion where a second guide part 250 and a second locking part 260 of the means of transportation 200 in the side step system according to the embodiment of the present disclosure are illustrated. The first guide part 130, the second guide part 250, the first locking part 140, and the second locking part 260 are described below in detail with reference to FIGS. 6 and 7.

The side step 100 may further include the first guide part 130. The first guide part 130 may guide a movement of the means of transportation 200 in the opening direction D1 or an opposite direction thereto when the means of transportation 200 is separated from or mounted in the inner space 110.

The means of transportation 200 may further include the second guide part 250. The second guide part 250 may be formed on the body 210 so as to correspond to the first guide part 130. When the second guide part 250 is formed on the body 210 so as to correspond to the first guide part 130, it may mean that the second guide part 250 is formed in a position on the body 210 that corresponds to the position of the first guide part 130 when the means of transportation 200 is mounted in the inner space 110.

The second guide part 250 may cooperate with the first guide part 130 to guide a movement of the body 210 in the inner space 110 in the opening direction D1 and the opposite direction thereto. When the second guide part 250 cooperates with the first guide part 130, it may mean that the two components interact with each other and one of the two components guides a movement of the other in a specific direction. For example, a protrusion may be inserted into a groove and may be guided in a specific direction by the groove.

The side step system according to the embodiment of the present disclosure may guide the means of transportation 200 through the first guide part 130 and the second guide part 250 such that the means of transportation 200 is located in a predetermined position in the inner space 110. Accordingly, the means of transportation 200 may be stably mounted in the inner space 110, and at this time, the conductor 230 and the charging terminal 150 may be stably electrically connected with each other.

One of the first guide part 130 or the second guide part 250 may have a protrusion shape, and the other may have a groove shape. More specifically, one of the first guide part 130 or the second guide part 250 may protrude toward the other and may have a protrusion shape extending along the opening direction D1. The other one of the first guide part 130 or the second guide part 250 may have a groove shape corresponding to the protrusion shape.

In other words, when the first guide part 130 has a protrusion shape, the second guide part 250 may have a groove shape, and when the first guide part 130 has a groove shape, the second guide part 250 may have a protrusion shape. In the drawings, the first guide part 130 is illustrated as having a groove shape, and the second guide part 250 is illustrated as having a protrusion shape.

Locking Parts

The side step 100 may include a side step body 120 and the first locking part 140. The inner space 110 may be formed in the side step body 120. The first locking part 140 may be coupled to the side step body 120 so as to be movable between a locking position and an unlocking position.

The locking position may be a position of the first locking part 140 when the first locking part 140 protrudes toward the inner space 110 to prevent the means of transportation 200 from being separated from the inner space 110 after mounted in the inner space 110. The unlocking position may be a position of the first locking part 140 when the first locking part 140 moves backward from the inner space 110 to allow the means of transportation 200 to be mounted in the inner space 110.

The means of transportation 200 may include the second locking part 260. The second locking part 260 may be provided in a predetermined position on the body 210 that corresponds to the position of the first locking part 140 when the means of transportation 200 is mounted in the inner space 110. The second locking part 260 may be formed such that the first locking part 140 is stopped by the second locking part 260.

Hereinafter, an example of a component for operation of the first locking part 140 and the second locking part 260 is described in detail. The side step 100 may further include an elastic member 160. The elastic member 160 may elastically restore the first locking part 140 from the unlocking position to the locking position. The elastic member 160 may be a torsion spring.

Figure 8:
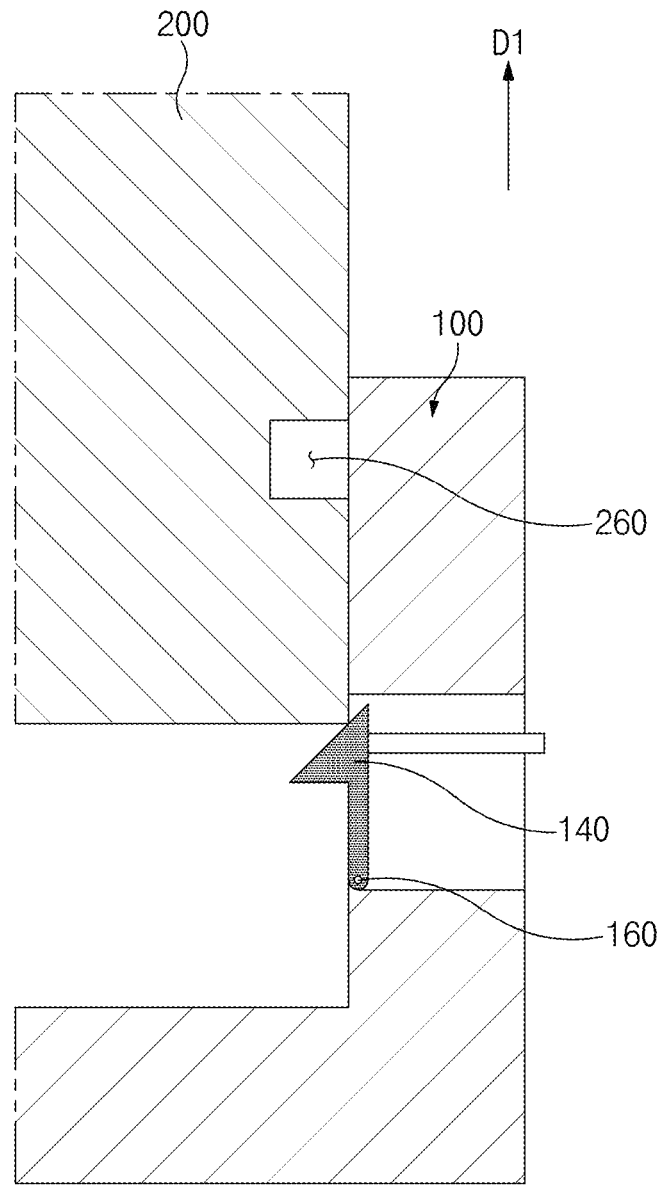
FIGS. 8, 9, and 10 are sectional views sequentially illustrating an example of an operation in which a first locking part is stopped by the second locking part of the side step system according to the embodiment of the present disclosure.
Figure 9:
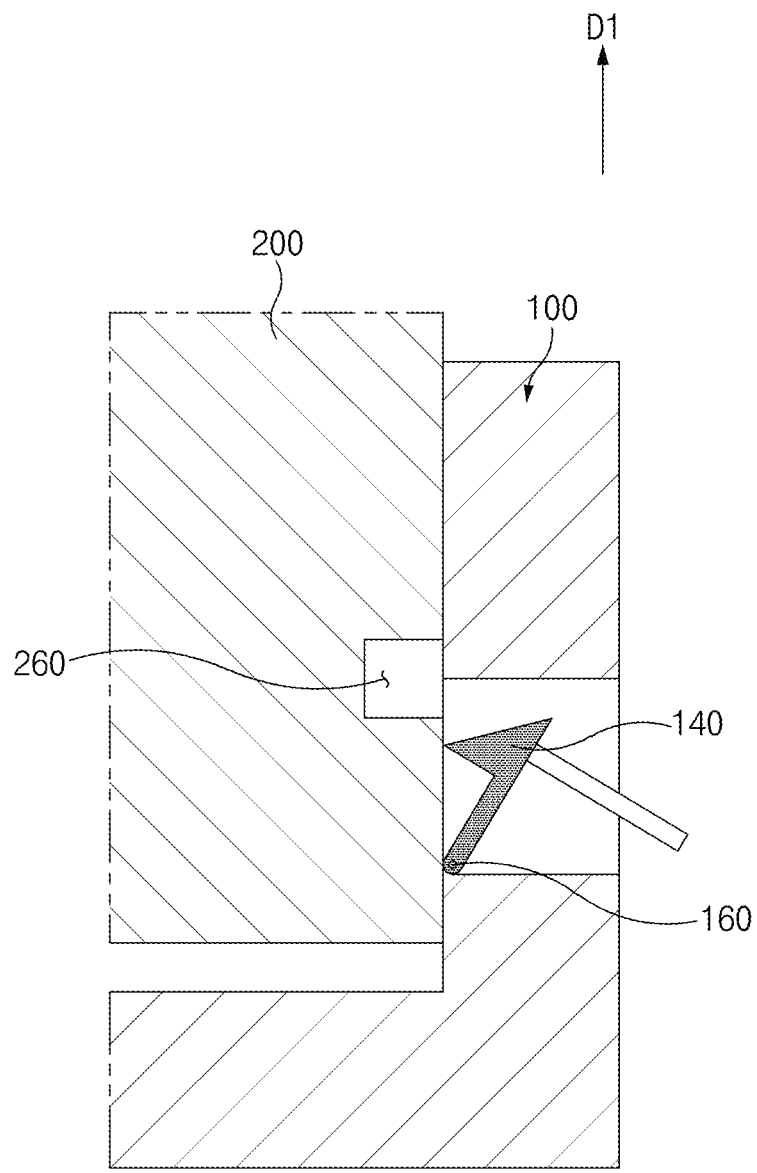
Figure 10:
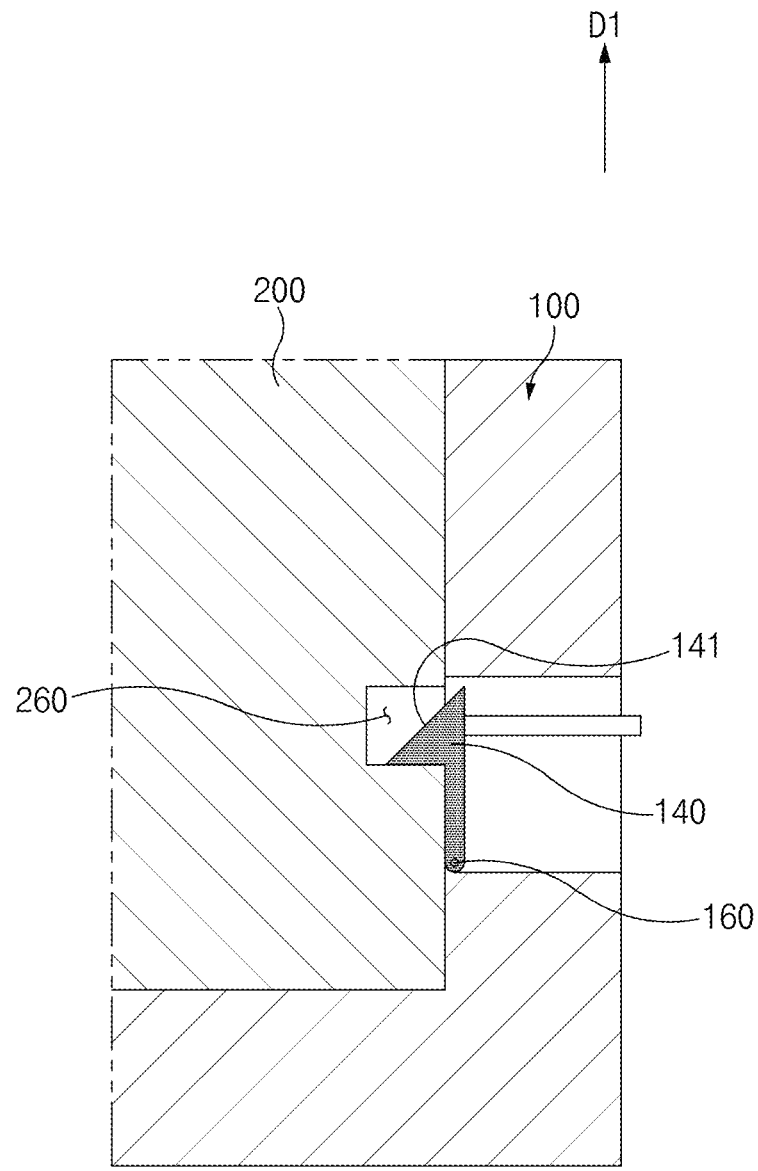

FIGS. 8, 9, and 10 are sectional views sequentially illustrating an example of an operation in which the first locking part is stopped by the second locking part of the side step system according to the embodiment of the present disclosure. FIG. 9 illustrates the first locking part located in the unlocking position. FIG. 10 illustrates the first locking part located in the locking position.

As illustrated in FIGS. 8, 9, and 10, the first locking part 140 may be rotatably coupled to the side step body 120. In a process in which the means of transportation 200 is mounted in the inner space 110, the first locking part 140 may be pressed and rotated to the unlocking position as illustrated in FIG. 9. Thereafter, in a process of being rotated to the locking position by the elastic member 160, the first locking part 140 may be stopped by the second locking part 260 as illustrated in FIG. 10.

The first locking part 140 may have an inclined surface 141 formed thereon. When the means of transportation 200 presses the inclined surface 141 in the process of being mounted in the inner space 110, the first locking part 140 may be rotated to the unlocking position. The second locking part 260 may have a groove shape corresponding to the shape of the first locking part 140.

Hereinafter, another example of the component for operation of the first locking part 140 and the second locking part 260 is described in detail. The side step 100 may further include an actuator (not illustrated). The actuator may move the first locking part 140 to the unlocking position or the locking position depending on an electrical signal transferred thereto. For example, the actuator may be a linear motor.

In this case, the first locking part 140 may have a shape illustrated in FIG. 8 or may have a polyhedral protrusion shape that is able to be moved forward and backward by the linear motor.

The second locking part 260 may have a groove shape corresponding to the shape of the first locking part 140.

For example, when the occupant wants to separate the means of transportation 200 from the inner space 110, the occupant may press a button of a smart key to transmit an electrical signal for moving the first locking part 140 to the unlocking position to the actuator. In this case, the first locking part 140 may be moved to the unlocking position, and the means of transportation 200 may be separated from the inner space 110.

In another example, when the occupant wants to obstruct separation of the means of transportation 200 from the inner space 110, the occupant may press a button of the smart key to transmit an electrical signal for moving the first locking part 140 to the locking position to the actuator. In this case, the first locking part 140 may be moved to the locking position. When the means of transportation 200 is disposed in the inner space 110, the first locking part 140 may be stopped by the second locking part 260, and separation of the means of transportation 200 from the inner space 110 may be obstructed.

In another example, when the ignition of the vehicle 1 (refer to FIG. 1) is turned on, a controller (not illustrated) in the vehicle 1 (refer to FIG. 1) may transmit an electrical signal for moving the first locking part 140 to the locking position to the actuator. The electrical signal may be transmitted to the actuator by a controller area network (CAN) communication method. In this case, the first locking part 140 may be moved to the locking position. When the means of transportation 200 is disposed in the inner space 110, the first locking part 140 may be stopped by the second locking part 260, and separation of the means of transportation 200 from the inner space 110 may be obstructed.

Body 210

The body 210 may include a foot board 211 and a steering member 212. The foot board 211 may be a member that the occupant stands on when operating the means of transportation 200. The steering member 212 may be coupled to the foot board 211 so as to be rotatable about a predetermined axis and may be rotated toward the foot board 211. The steering member 212 may be fixed such that rotation is restricted in a specific position. The steering member 212 may be connected to the wheel 220, and the occupant may turn the steering member 212 to control a travel direction when operating the means of transportation 200.

In a locked state, the steering member 212 and the foot board 211 may be disposed adjacent to each other. The locked state may be a state in which the steering member 212 is rotated toward the foot board 211 to the maximum. As the steering member 212 and the foot board 211 are disposed adjacent to each other as illustrated in FIG. 4, the clearance between the steering member 212 and the foot board 211 may be minimized when the one surface 201 of the means of transportation 200 is connected with the upper surface 101 of the side step 100 to form the support surface 2. Accordingly, an accident in which the occupant's foot is caught in the clearance may be prevented.

The steering member 212 may include a steering member body 213 and a handle 214. The handle 214 may be rotatably coupled to the steering member body 213. When the means of transportation 200 is disposed in the inner space 110, the handle 214 may be rotated to correspond to the shape of the inner space 110.

For example, as illustrated in FIG. 3, the inner space 110 may be formed such that a direction D3 perpendicular to the foot board 211 and the opening direction D1 cross each other when the means of transportation 200 is disposed in the inner space 110. For example, the direction D3 perpendicular to the foot board 211 and the opening direction D1 may be perpendicular to each other. In this case, an upper surface of the side step body 120 and the one surface 201 of the means of transportation 200 may be disposed to be connected together. When a general travel direction is a fore/aft direction, the one surface 201 of the means of transportation 200 may be a side surface of the means of transportation 200. For example, the direction D3 perpendicular to the foot board 211 and the exposure direction D2 may be parallel to each other.

The width of the foot board 211 may be formed to correspond to the height of the inner space 110. As the width of the foot board 211 corresponds to the height of the inner space 110, a step may not be formed when the upper surface of the side step body 120 and the one surface 201 of the means of transportation 200 are connected.

The inner space 110 may be formed to correspond to at least part of the shape that the means of transportation 200 has when the steering member 212 is in the locked state. The means of transportation 200 may have a large volume, and therefore it may be difficult to place the means of transportation 200 in the inner space 110 of the side step 100. Accordingly, the inner space 110 may be formed to correspond to at least part of the shape that the means of transportation 200 has when the steering member 212 is in the locked state to minimize a space occupied, and at least part of the means of transportation 200 may be disposed in the inner space 110.

More specifically, a portion of the inner space 110 that corresponds to the position of the wheel 220 may be formed to be open such that at least part of the wheel 220 protrudes from the area that the side step 100 occupies when the means of transportation 200 is disposed in the inner space 110. In other words, the standard of the wheel 220 has to be ensured for smooth operation of the means of transportation 200, but there may be a case in which the wheel 220 is too large to be inserted into the inner space 110 of the side step 100. Accordingly, the portion of the inner space 110 that corresponds to the position of the wheel 220 may be formed to be open, and a portion of the wheel 220 may be disposed to protrude from the inner space 110. Thus, the problem in which the wheel 220 is not completely inserted into the inner space 110 may be solved.

Separating and Mounting Process of Means of Transportation

Figure 11:
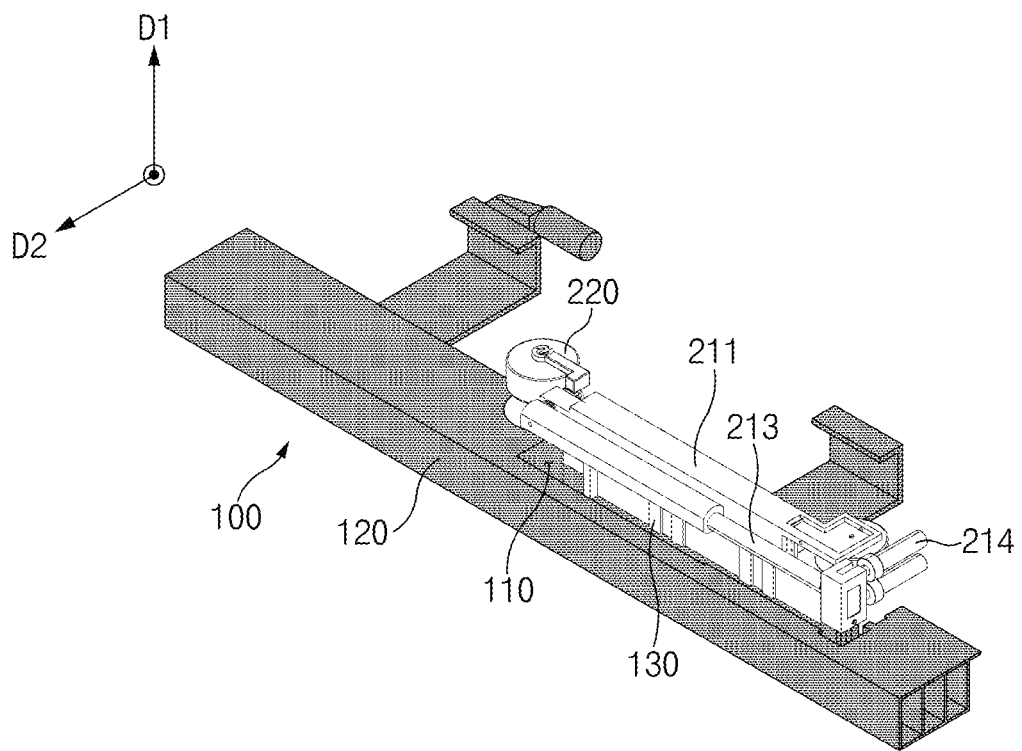
FIGS. 11, 12, and 13 are views sequentially illustrating a process in which the means of transportation is separated from the inner space of the side step system according to the embodiment of the present disclosure and is ready to operate.
Figure 12:
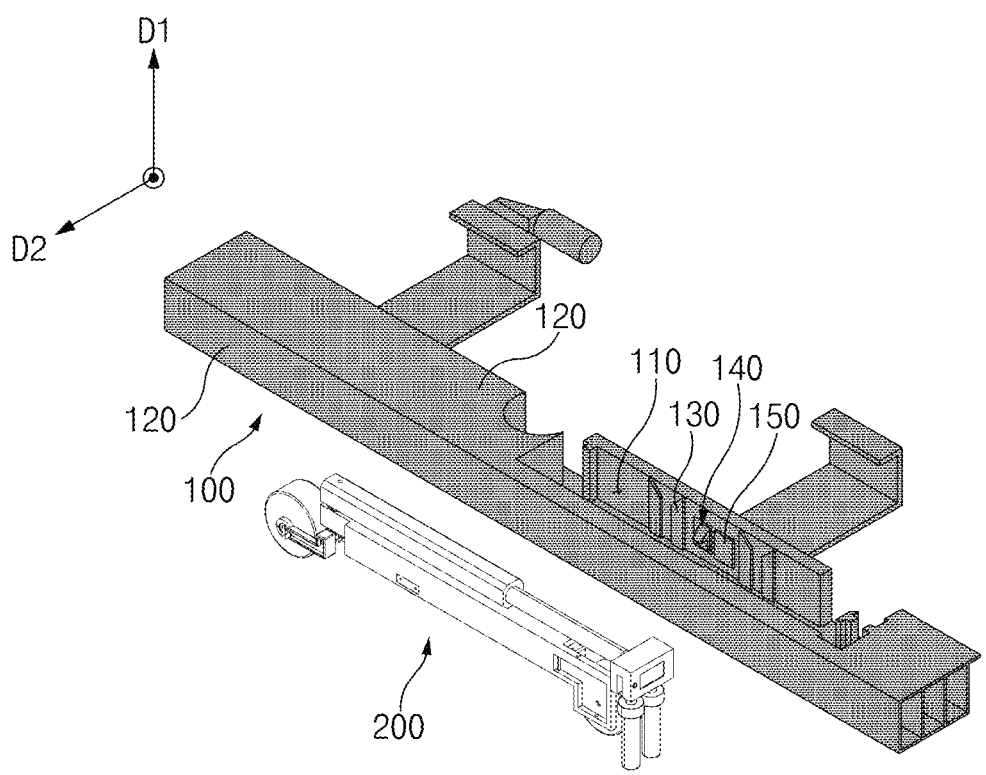
Figure 13:
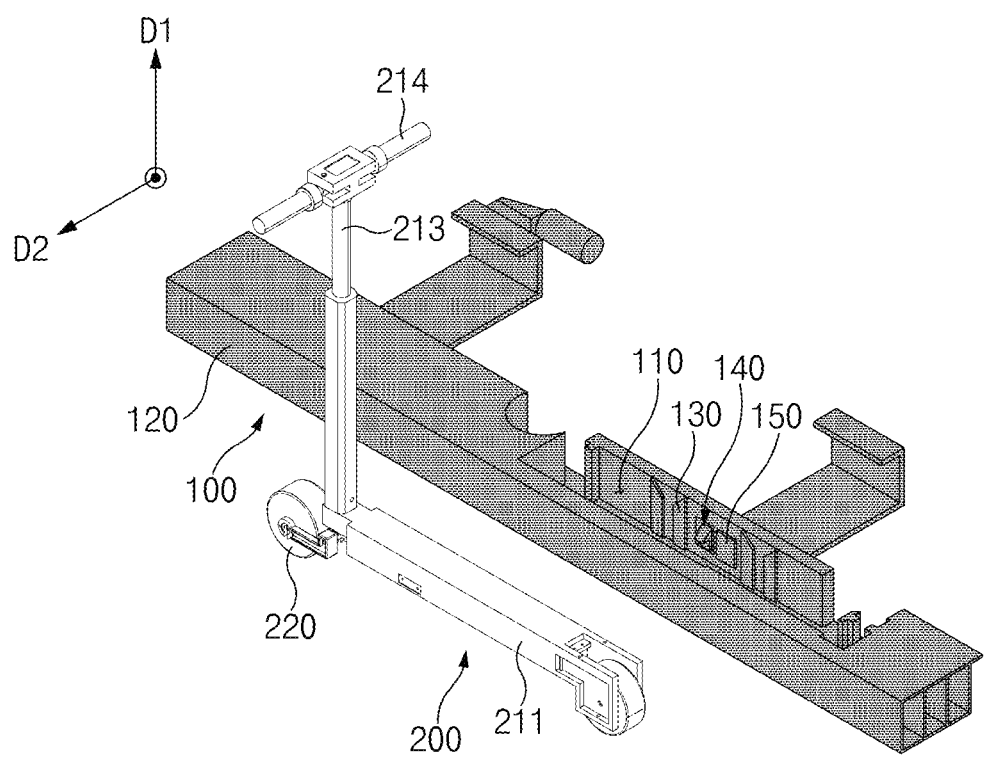

FIGS. 11, 12, and 13 are views sequentially illustrating a process in which the means of transportation is separated from the inner space of the side step system according to the embodiment of the present disclosure and is ready to operate. Hereinafter, the process in which the means of transportation 200 is separated from the inner space 110 and is ready to operate is described in detail with reference to FIGS. 3, 11, 12, and 13. A process in which the means of transportation 200 is mounted in the inner space 110 should be understood as being performed in a reverse order to that in which the means of transportation 200 is separated from the inner space 110.

First, the side step 100 may be moved in the exposure direction D2, and the means of transportation 200 may be separated from the inner space 110 (refer to FIG. 2) in the opening direction D1. This should be understood as a transition from the state of FIG. 3 to the state of FIG. 11.

Next, the means of transportation 200 may be lowered onto the ground such that the wheel 220 of the means of transportation 200 is supported on the ground. This should be understood as a transition from the state of FIG. 11 to the state of FIG. 12.

Thereafter, the steering member 212 of the body 210 may be rotated in a direction away from the foot board 211 and may be fixed to a predetermined position. At this time, the handle 214 may also be rotated and may be fixed to a position in which the occupant is able to hold the handle 214 with the occupant's hands. This should be understood as a transition from the state of FIG. 12 to the state of FIG. 13. Accordingly, the means of transportation 200 may be in a standby state for operation, and the occupant may operate the means of transportation 200 to move to a destination.

Vehicle

Hereinafter, the vehicle 1 (refer to FIG. 1) that includes a side step 100 is described in detail with reference to FIG. 1. Components identical or similar to those of the side step 100 of the side step system described above are assigned with identical or similar reference numerals or reference numerals thereof have been omitted, and specific descriptions thereabout have been omitted.

The vehicle 1 (refer to FIG. 1) according to an embodiment of the present disclosure may include the side step 100. The side step 100 may include an inner space 110 that is open in a predetermined opening direction D1. The side step 100 may be coupled to a lower side of the vehicle 1 (refer to FIG. 1) so as to be movable in an exposure direction D2 and an opposite direction thereto. The exposure direction D2 may be a direction in which the inner space 110 is exposed outside the vehicle 1 (refer to FIG. 1). When the side step 100 is moved in the exposure direction D2, the side step 100 may assist an occupant to get in the vehicle 1 (refer to FIG. 1).

The inner space 110 may be provided such that a means of transportation 200 is able to be separated from the inner space 110 for operation when the side step 100 is moved in the exposure direction D2.

The side step 100 described above with regard to the side step system may be identically applied to the side step 100 of the vehicle 1.

According to the present disclosure, the means of transportation may be disposed in the inner space of the side step. Accordingly, the space of the vehicle may be efficiently used, and the occupant may conveniently move to a destination even when the destination is located far away from a parking lot.

Hereinabove, although the present disclosure has been described with reference to specific embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims. Therefore, the specific embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:
1. A side step system comprising:
a side step including an inner space that is open in an opening direction; and
a means of transportation mounted in the inner space and configured to be operable when separated from the inner space,
wherein the means of transportation includes
a body formed to be mounted in the inner space, and
a wheel rotatably coupled to the body and configured to rotate to move the body.
2. The side step system of claim 1, wherein the means of transportation further includes:

a conductor connected to the body and electrically connected with a charging terminal of the side step when the body is mounted in the inner space; and a battery configured to supply electric power to rotate the wheel, the battery being charged when the conductor is electrically connected with the charging terminal of the side step.

3. The side step system of claim 1, wherein the side step further includes a first guide part configured to guide a movement of the means of transportation in the opening direction or an opposite direction thereto when the means of transportation is mounted in or separated from the inner space.

4. The side step system of claim 3, wherein the means of transportation further includes:

a second guide part formed on the body to correspond to the first guide part and configured to guide a movement of the body in the inner space in the opening direction or the opposite direction thereto in cooperation with the first guide part.

5. The side step system of claim 4, wherein one of the first guide part or the second guide part protrudes toward the other and has a protrusion shape extending along the opening direction, and the other has a groove shape corresponding to the protrusion shape.

6. The side step system of claim 1, wherein the side step includes:

a side step body having the inner space formed therein; and a first locking part coupled to the side step body so as to be movable between a locking position and an unlocking position to obstruct separation of the means of transportation from the inner space after the means of transportation is mounted in the inner space, wherein in the locking position, the first locking part protrudes toward the inner space and prevents the separation of the means of transportation, and in the unlocking position, the first locking part moves backward from the inner space and allows the means of transportation to be mounted in the inner space.

7. The side step system of claim 6, wherein the means of transportation further includes:

a second locking part provided in a predetermined position on the body to correspond to a position of the first locking part, the second locking part being formed such that the first locking part is stopped by the second locking part when the means of transportation is mounted in the inner space.

8. The side step system of claim 7, wherein the side step further includes an elastic member configured to elastically restore the first locking part from the unlocking position to the locking position, wherein the first locking part is rotatably coupled to the side step body, and wherein the first locking part is rotated to the unlocking position by being pressed in a process in which the means of transportation is mounted in the inner space, and the first locking part is stopped by the second locking part in a process of being rotated to the locking position by the elastic member.

9. The side step system of claim 6, wherein the side step further includes an actuator configured to move the first locking part to the unlocking position or the locking position depending on an electrical signal transferred thereto.

10. The side step system of claim 1, wherein the inner space is formed to be open at the top, and wherein when the means of transportation is mounted in the inner space, one surface of the means of transportation is connected with an upper surface of the side step to form a support surface that an occupant puts the occupant's foot on to get in a vehicle.

11. The side step system of claim 1, wherein the body includes:

a foot board that an occupant stands on when operating the means of transportation; and a steering member coupled to the foot board so as to be rotatable about a predetermined axis and configured to rotate toward the foot board, the steering member being connected to the wheel, wherein the occupant turns the steering member to control a travel direction when operating the means of transportation, and wherein the steering member and the foot board are disposed adjacent to each other when the steering member is in a locked state in which the steering member is rotated toward the foot board to the maximum.

12. The side step system of claim 11, wherein the inner space is formed such that a direction perpendicular to the foot board and the opening direction cross each other when the means of transportation is disposed in the inner space, and wherein the foot board has a width corresponding to a height of the inner space.

13. The side step system of claim 11, wherein the inner space is formed to correspond to at least part of a shape that the means of transportation has when the steering member is in the locked state.

14. The side step system of claim 11, wherein a portion of the inner space that corresponds to a position of the wheel is formed to be open such that at least part of the wheel protrudes from an area that the side step occupies when the means of transportation is disposed in the inner space.

15. A vehicle comprising:

a side step including an inner space that is open in an opening direction, the side step being coupled to a lower side of the vehicle so as to be movable in an exposure direction in which the inner space is exposed outside the vehicle and in a direction opposite to the exposure direction, wherein when moved in the exposure direction, the side step assists an occupant to get in the vehicle, wherein a means of transportation is mounted in the inner space and is separated from the inner space for operation when the side step is moved in the exposure direction, and wherein the means of transportation includes a body formed to be mounted in the inner space, and a wheel rotatably coupled to the body and configured to rotate to move the body.

16. A side step system comprising:

a side step including an inner space that is open in an opening direction; and a means of transportation mounted in the inner space and configured to be operable when separated from the inner space, wherein the inner space is formed to be open at the top, and wherein, when the means of transportation is mounted in the inner space, one surface of the means of transportation is connected with an upper surface of the side step to form a support surface that an occupant puts the occupant's foot on to get in a vehicle.

* * * * *